(12) United States Patent
Martikainen et al.

(10) Patent No.: US 10,604,427 B2
(45) Date of Patent: Mar. 31, 2020

(54) ELECTROCHEMICAL REACTOR, AN APPARATUS AND A SYSTEM FOR TREATING WATER, AND A METHOD FOR CONTROLLING A WATER TREATMENT APPARATUS

(71) Applicant: OUTOTEC (FINLAND) OY, Espoo (FI)

(72) Inventors: Mika Martikainen, Espoo (FI); Mikko Karhu, Espoo (FI); Matti Luukkonen, Helsinki (FI); Niko Isomäki, Helsinki (FI); Tuomas Van Der Meer, Espoo (FI)

(73) Assignee: OUTOTEC (FINLAND) OY, Espoo (FI)

( * ) Notice: Subject to any disclaimer, the term of this patent is extended or adjusted under 35 U.S.C. 154(b) by 52 days.

(21) Appl. No.: 16/010,752

(22) Filed: Jun. 18, 2018

(65) Prior Publication Data

US 2018/0297869 A1 Oct. 18, 2018

Related U.S. Application Data

(63) Continuation of application No. PCT/FI2016/050903, filed on Dec. 21, 2016.

(30) Foreign Application Priority Data

Dec. 22, 2015 (FI) .................................. 20155992

(51) Int. Cl.
*C02F 1/461* (2006.01)
*C02F 1/00* (2006.01)
(Continued)

(52) U.S. Cl.
CPC .......... *C02F 1/46109* (2013.01); *C02F 1/008* (2013.01); *C02F 1/46104* (2013.01);
(Continued)

(58) Field of Classification Search
CPC ........................... C02F 1/46109; C02F 1/008; C02F 2209/006; C02F 2209/001;
(Continued)

(56) References Cited

U.S. PATENT DOCUMENTS

| 785,214 A | 3/1905 | Hendryx |
| 3,579,431 A | 5/1971 | Jasberg |

(Continued)

FOREIGN PATENT DOCUMENTS

| DE | 10040417 A1 | 3/2001 |
| DE | 112012003846 T5 | 7/2014 |

(Continued)

OTHER PUBLICATIONS

Finnish Search Report issued by the Finnish Patent and Registration Office in relation to Finnish Application No. 20155992 dated Jun. 27, 2016 (2 pages).

(Continued)

*Primary Examiner* — Arun S Phasge
(74) *Attorney, Agent, or Firm* — Robert P. Michal, Esq.; Carter, DeLuca & Farrell LLP

(57) ABSTRACT

A water treatment apparatus includes an electrochemical reactor including a shell structure and a support structure for supporting the shell structure on a base. The support structure includes at least one support element supporting the shell structure from the ledge. A head room portion includes, within the inner space of the shell structure, at least one shelf for receiving and supporting at least one lug portion of at least one electrode plate for suspending the electrode plate. The shelf being located, when in use, preferably directly above the ledge.

21 Claims, 10 Drawing Sheets

(51) Int. Cl.
| | |
|---|---|
| C02F 1/463 | (2006.01) |
| C02F 103/10 | (2006.01) |
| C02F 103/28 | (2006.01) |
| C02F 103/30 | (2006.01) |
| C02F 103/32 | (2006.01) |
| C02F 103/34 | (2006.01) |
| C02F 103/16 | (2006.01) |

(52) U.S. Cl.
CPC .... *C02F 1/463* (2013.01); *C02F 2001/46152* (2013.01); *C02F 2103/10* (2013.01); *C02F 2103/16* (2013.01); *C02F 2103/28* (2013.01); *C02F 2103/30* (2013.01); *C02F 2103/32* (2013.01); *C02F 2103/346* (2013.01); *C02F 2201/007* (2013.01); *C02F 2201/4613* (2013.01); *C02F 2201/46145* (2013.01); *C02F 2209/001* (2013.01); *C02F 2209/003* (2013.01); *C02F 2209/005* (2013.01); *C02F 2209/006* (2013.01)

(58) Field of Classification Search
CPC .... C02F 2201/46145; C02F 2201/4613; C02F 2201/007; C02F 2103/346; C02F 2103/32; C02F 2103/30; C02F 2103/28; C02F 2103/10; C02F 2001/46152; C02F 1/463; C02F 1/46104; C02F 2209/005; C02F 2209/003; C02F 2103/16
See application file for complete search history.

(56) References Cited

U.S. PATENT DOCUMENTS

| | | |
|---|---|---|
| 6,398,939 B1 | 6/2002 | Huens et al. |
| 8,945,353 B1* | 2/2015 | Fraim .................. C02F 1/4672 |
| | | 204/232 |
| 2014/0138238 A1 | 5/2014 | Wood et al. |

FOREIGN PATENT DOCUMENTS

| | | | |
|---|---|---|---|
| EP | 0286093 A1 | 10/1988 | |
| JP | H03193200 A | 8/1991 | |
| JP | 2004230344 A | 8/2004 | |
| WO | WO-02092200 A1 | 11/2002 | |
| WO | WO-2009025837 A1 | 2/2009 | |
| WO | WO-2012087398 A1 | 6/2012 | |

OTHER PUBLICATIONS

International Search Report issued by the European Patent Office acting as the International Searching Authority in relation to International Application No. PCT/FI2016/050903 dated Feb. 27, 2017 (5 pages).
Written Opinion of the International Searching Authority issued by the European Patent Office acting as the International Searching Authority in relation to International Application No. PCT/FI2016/050903 dated Feb. 27, 2017 (7 pages).
International Preliminary Report on Patentability issued by the European Patent Office acting as the International Preliminary Examining Authority in relation to International Application No. PCT/FI2016/050903 dated Feb. 1, 2018 (7 pages).

* cited by examiner

ELECTROCHEMICAL REACTOR, AN APPARATUS AND A SYSTEM FOR TREATING WATER, AND A METHOD FOR CONTROLLING A WATER TREATMENT APPARATUS

CROSS-REFERENCE TO RELATED APPLICATIONS

This application is a continuation of PCT International Application No. PCT/FI2016/050903 filed Dec. 21, 2016, which claims priority to Finnish Patent Application No. 20155992, filed Dec. 22, 2015, the disclosure of each of these applications is expressly incorporated herein by reference in their entirety.

FIELD OF THE INVENTION

The present invention relates to electrochemically treating water, and more particularly to an electrochemical reactor.

The present invention further concerns an apparatus and a system for electrochemically treating water, a method for controlling a water treatment apparatus, and a computer program product related thereto.

BACKGROUND INFORMATION

Electrochemically treating water, as such, is well known in the art. The underlying principle is that water is passes by electrically charged electrodes, thus electrochemically removing impurities.

Publication US 2014138238 A1 discloses an apparatus and a method for removing contaminant species from water by electrocoagulation. The apparatus includes a container, which fits into and is supported by a frame, a rotating electrode and a stationary electrode. A lid is attached to a top of the frame.

Publication U.S. Pat. No. 785,214 A discloses an apparatus for extracting metals from their ores. The apparatus includes a tank, which fits into and is supported by a frame, and electrode plates, which are placed in a block.

Publication U.S. Pat. No. 3,579,431 A discloses an electrolytic cell for electrolytic deposition of metals. An electrode plate is welded to a precast aluminum header bar, which has tow hooks for lifting and lowering the plate.

Publication JP H03193200 A discloses easily replaced electrode plates for sludge. Electrode plates are parallel-disposed in an electrolysis vessel. The parallel disposed electrode plates are spaced at regular intervals through spacers made from nonconductor such as synthetic resins and clamped.

Publication DE 10040417 discloses an electrolytic treatment to waste water. Electrodes are installed in respective electrode supports which are supported by a supporting bar, so that they do not immerse in the treating water in the electrolyzer. The electrode support comprises also a grip for helping handling the electrodes.

SUMMARY

An object of the present invention is to provide an electrochemical reactor, an apparatus and a system for electrochemically treating water in which the load of the electrode plates does not strain the shell structure.

This object is achieved by the apparatus for electrochemically treating water and the system for electrochemically treating water.

It is a further object of the present invention to provide a method for controlling a water treatment apparatus, a method for controlling a water treatment system, and computer program products related thereto, respectively.

The invention is based on the idea that the electrochemical reactor is formed of a shell structure defining a flow route for the water flow past the electrode plates, and a separate support structure that supports the shell structure, and particularly, the weight of the of the electrode plates.

Accordingly, as the design of the shell structure is not constrained by the mechanical rigidity requirements for carrying the load of the electrode plates, the shell structure can be more freely designed for optimizing the electrochemical treatment process itself. Additionally, several other aspects can be taken into consideration when designing the shell structure. Furthermore, as the shell structure does not need to carry the load of the electrode plates, low cost materials, such as plastic materials, may be used.

Particularly, a shelf structure can be formed within the shell structure for supporting electrode plate by their lugs, thus facilitating introduction and replacement of the electrode plates.

As the shell structure, and particularly the load caused by the weight of the electrode plates, is carried by the separate support structure, a weight sensor means can easily be arranged for monitoring the weight of the electrode plates, and particularly, the change thereof. This, in turn, enables new opportunities for controlling the electrochemical process. Furthermore, weight sensor means can be used for monitoring the weight of the water volume within the shell structure, thus enabling new opportunities for controlling the water treatment system.

BRIEF DESCRIPTION OF THE DRAWINGS

In the following the invention will be described in greater detail by means of preferred embodiments with reference to the accompanying drawings, in which

FIG. 1b illustrates a front view of the electrochemical reactor of FIG. 1a;

FIG. 1c illustrates a side view of the electrochemical reactor of FIG. 1a;

FIG. 2b illustrates a front view of the shell structure of FIG. 2a;

FIG. 2c illustrates a side view of the shell structure of FIG. 2a;

DETAILED DESCRIPTION

Figure 1A:
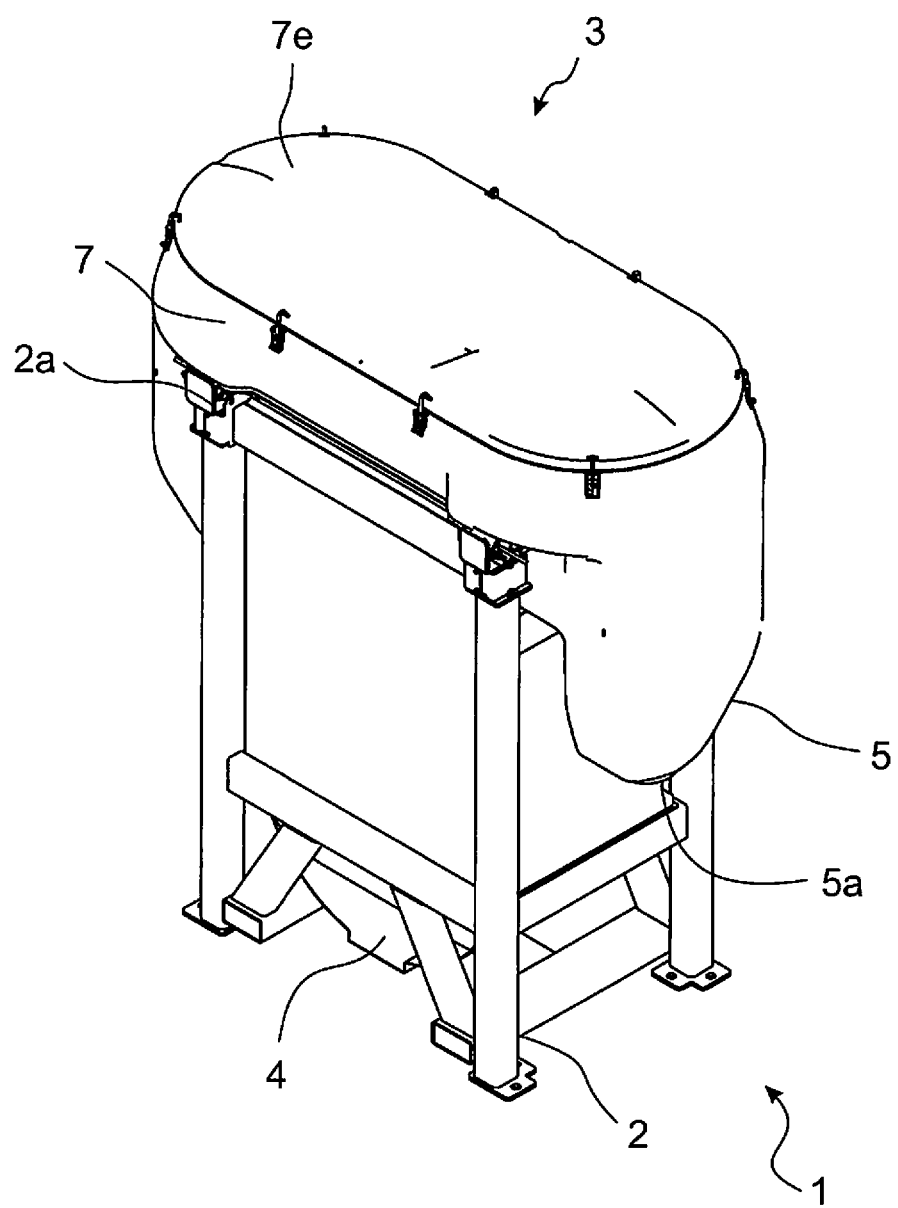
FIG. 1a illustrates a perspective view of an electrochemical rector according to an aspect of the preset invention.

FIG. 1a illustrates a perspective view of an electrochemical reactor according to an aspect of the present invention. The electrochemical reactor 1 comprises a separate support structure 2 supporting a shell structure 3. The support structure 2 comprises two support elements 2a extending through the shell 3 without penetrating its outer surface just below a head room portion 7 of the shell 3. The head room portion 7 is equipped with a top lid 7e. The shell structure 3 further comprises an inlet portion 4 with an inlet (not illustrated in FIG. 1a), an outlet portion with an outlet 5a, and an reactor chamber 6 (not illustrated in FIG. 1a).

Figure 1B:
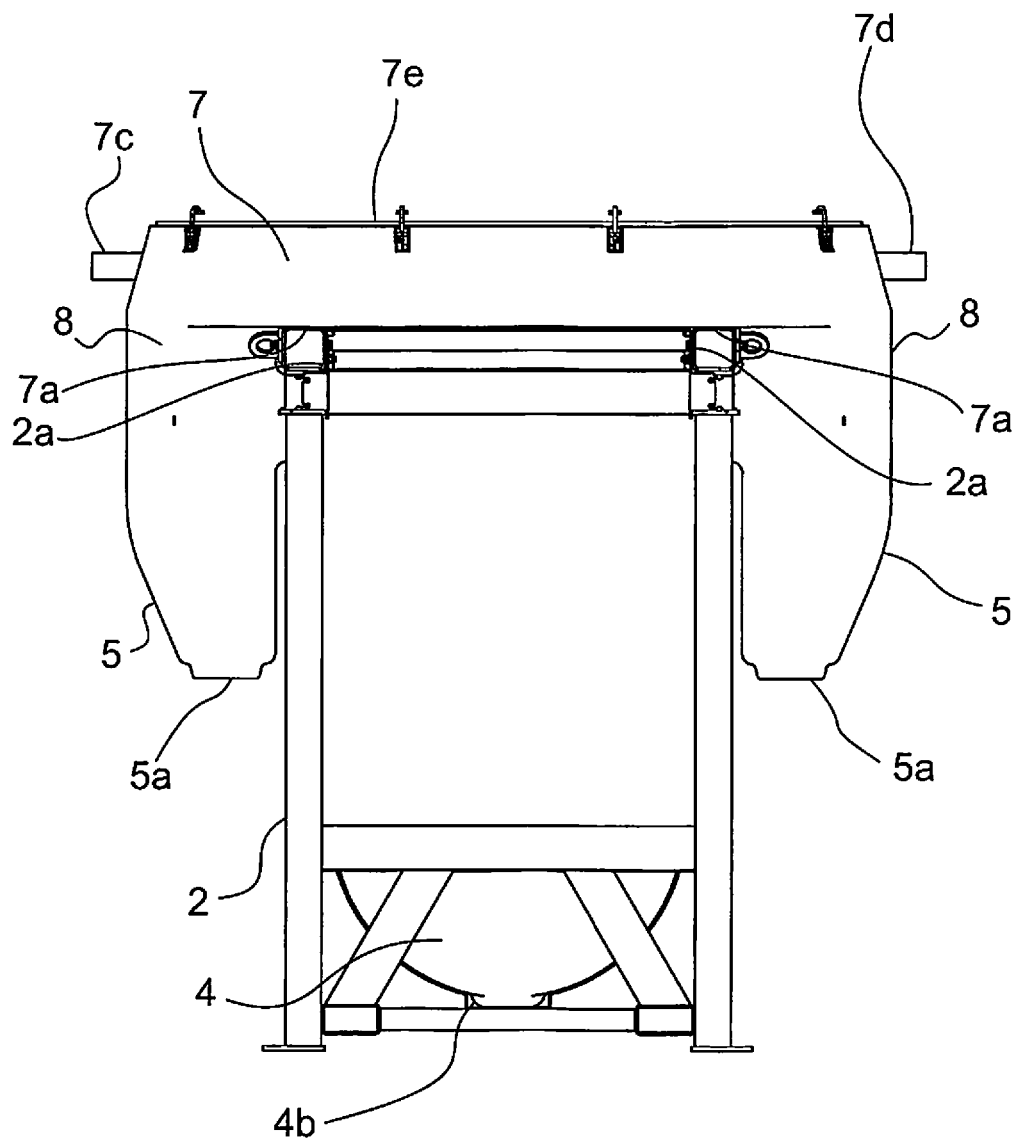

FIG. 1b illustrates a front view of the electrochemical reactor of FIG. 1a. The support elements 2a support the shell structure by two ledges 7a of the head room portion 7. Furthermore, it can be seen that the head room portion 7, at its distal ends, has protrusion 8 that extend up to the outlet portions 5. The inlet portion 4 has a drainage connection 4b for draining the electrochemical reactor 1. Additionally, an airflow inlet 7c and an airflow outlet 7d can be seen as arranged on the head room portion 7.

Figure 1C:
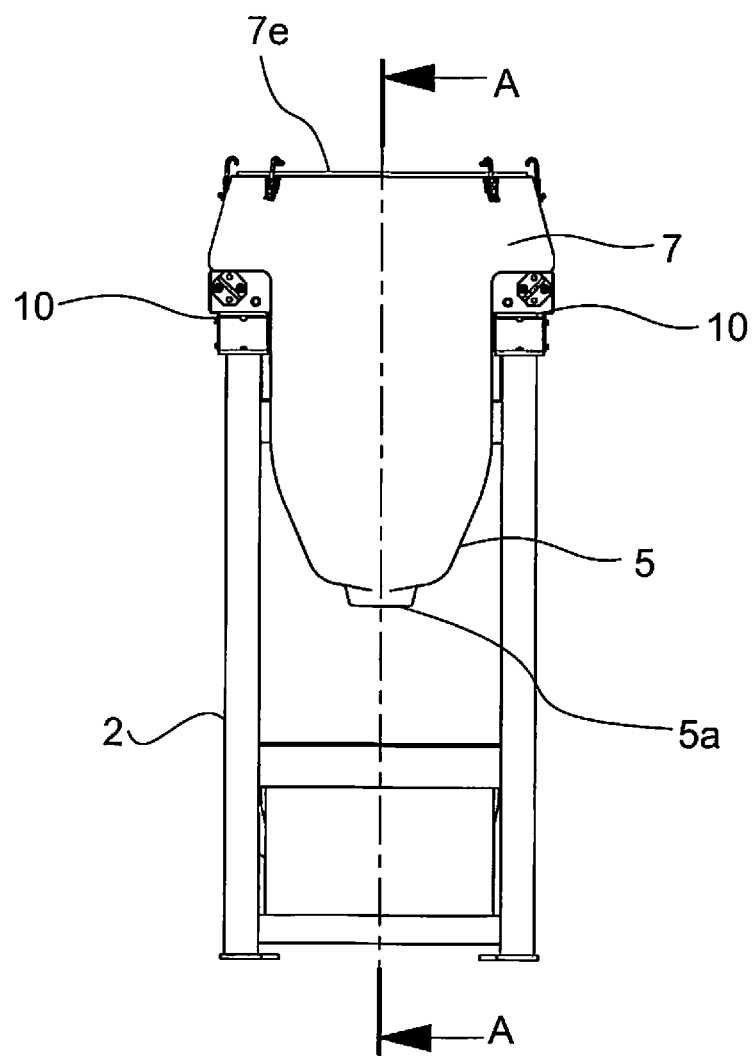

FIG. 1c illustrates a side view of the electrochemical reactor of FIG. 1a. Additionally, exemplary positions for a weight sensor means are indicated with the reference numeral 10.

Figure 2A:
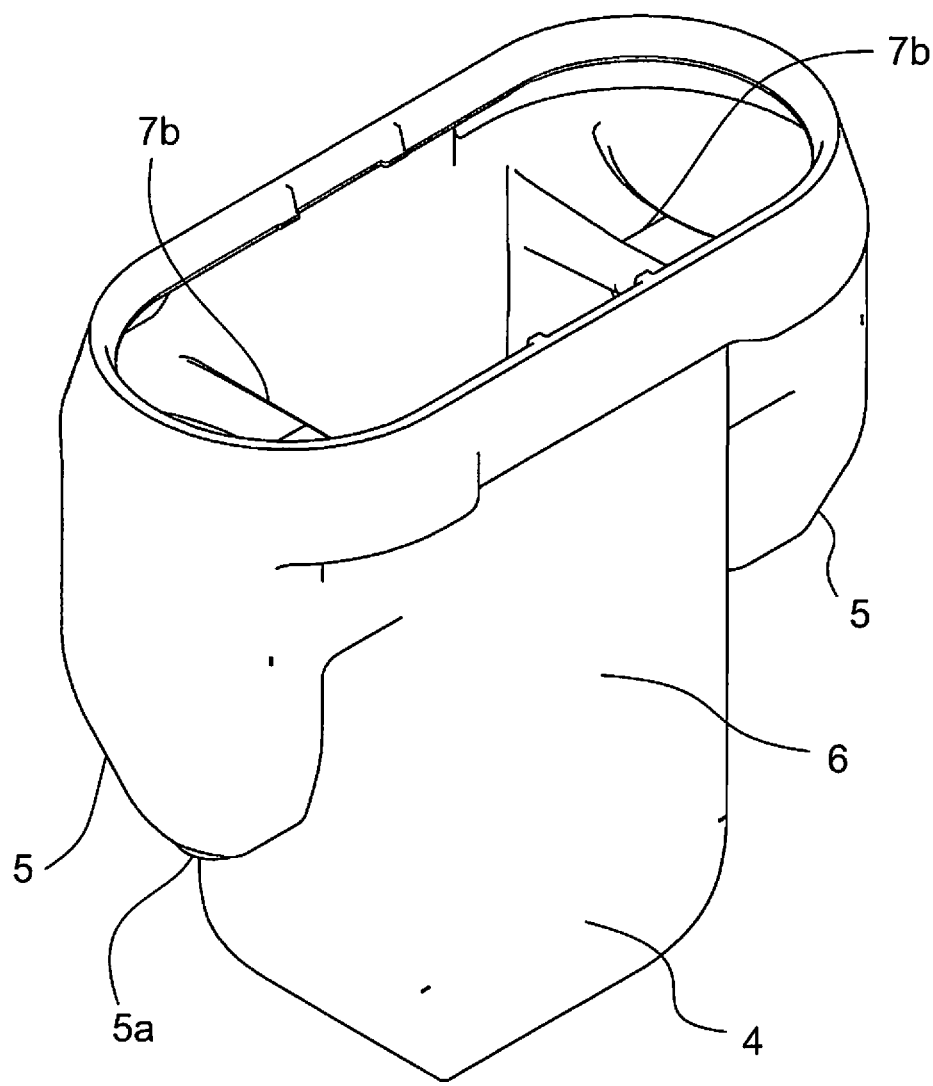
FIG. 2a illustrates a perspective view of a shell structure without a lid of an electrochemical rector according to an aspect of the preset invention.

FIG. 2a illustrates a perspective view of a shell structure 3 without a lid 7e according to an aspect of the present invention. As the support structure 2 is not present, a part of the shell structure 3 forming the reactor chamber 6 is visible. Furthermore, the two shelves are formed at the head room portion 7, within the inner space of the shell structure 3.

Figure 2B:
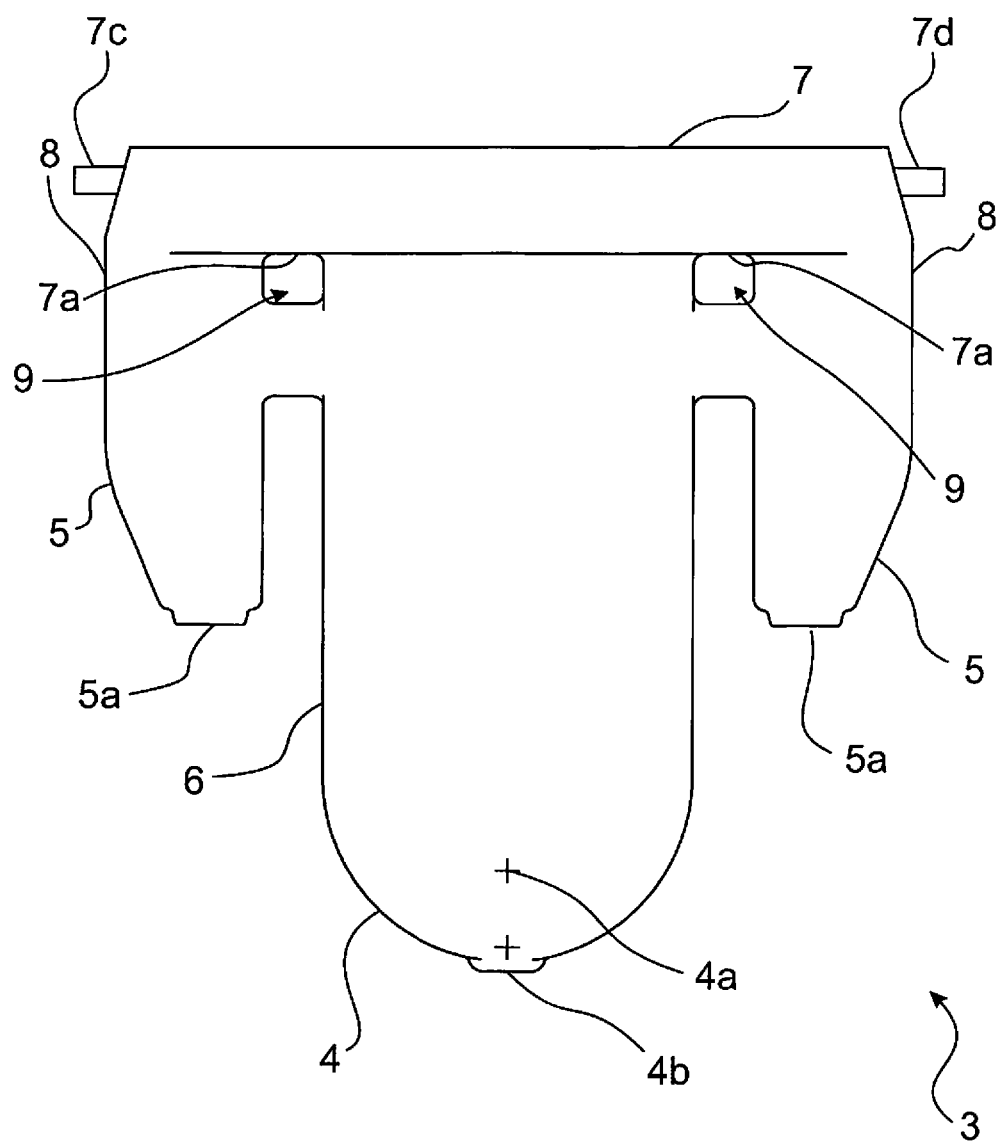

FIG. 2b illustrates a front view of the shell structure of FIG. 2a. Two cavities 9 extending through the shell structure 3, without penetrating its outer surface, can be clearly seen. Furthermore, the positions of the inlet 4a and the drainage connection 4b are marked with crosses.

Figure 2C:
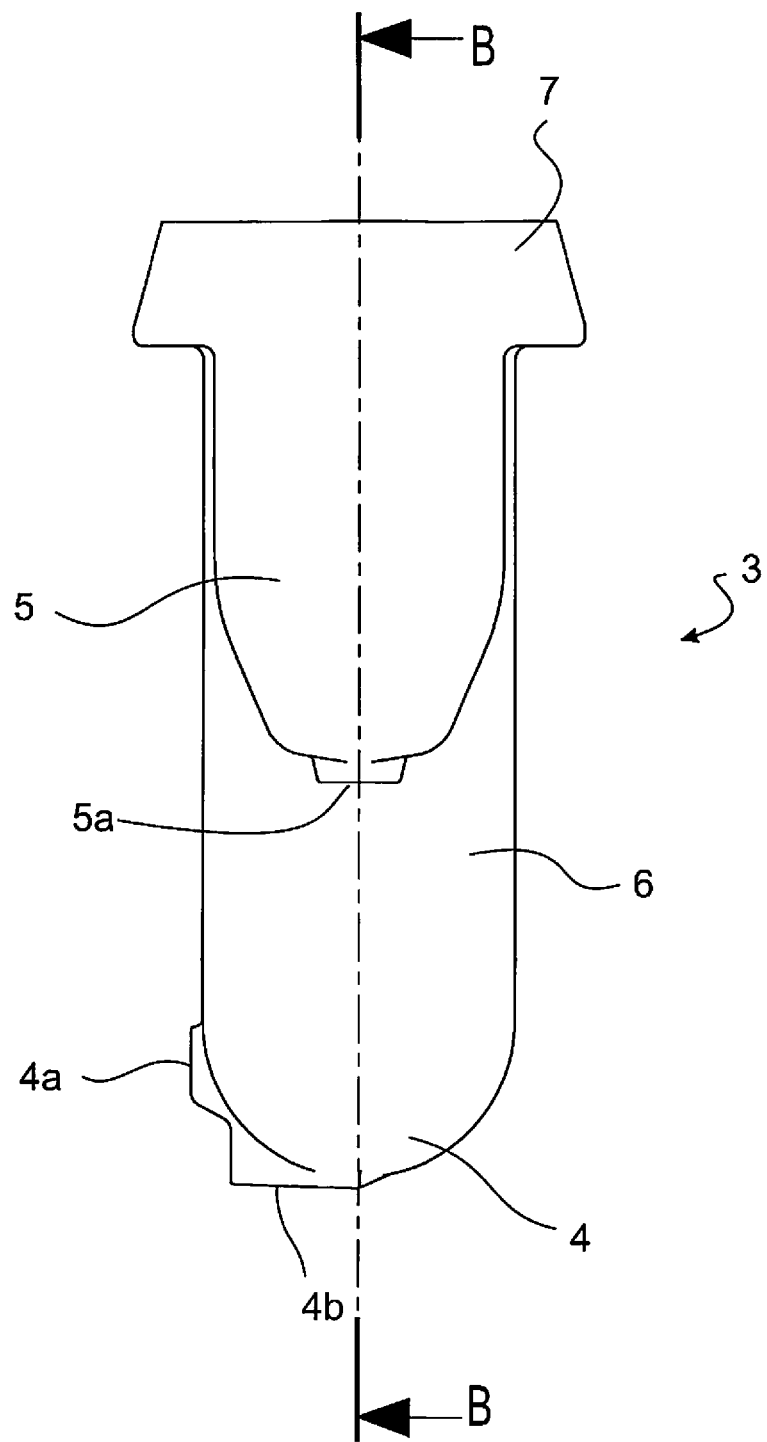

FIG. 2c, in turn, illustrates a side view of the shell structure of FIG. 2a.

Figure 3A:
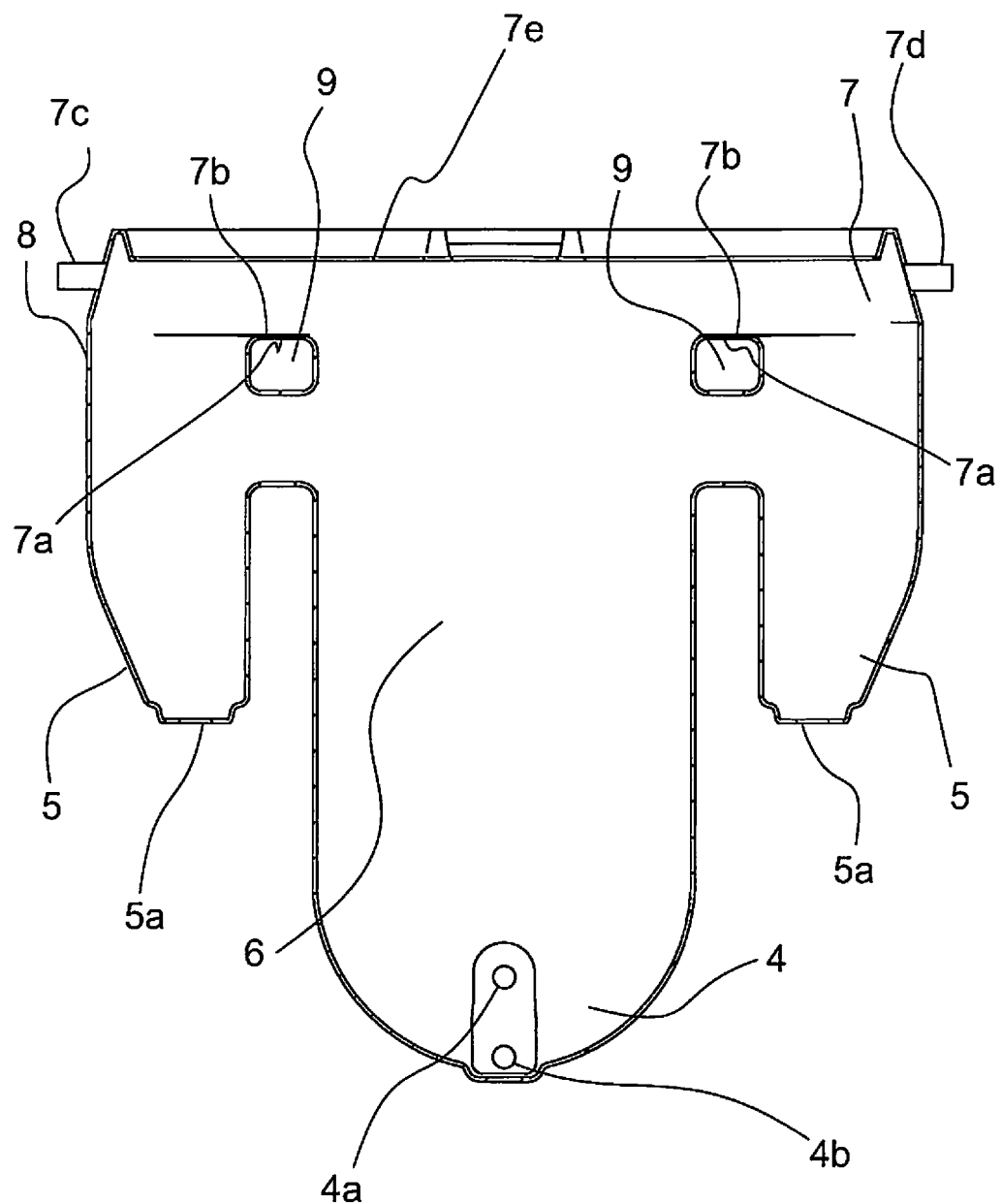
FIG. 3a illustrates a cut view along line B-B of FIG. 2c.

FIG. 3a illustrates a cut view along the line B-B of FIG. 2c. Particularly, the shell structure 3 comprises an inlet portion 4 into which a water flow is introduced through inlet 4a. In fluid connection with the inlet portion 4, and above it, is a reactor chamber 6 arranged for receiving a plate portion 20a of at least one electrode plate 20. The shell structure 3 further comprises an outlet portion 5 having an outlet 5a, through which the water flow discharged from the electrochemical reactor 1. The outlet portion 5 is in fluid connection with the reactor chamber 6 at the top part thereof, such that the water flow introduced to the inlet portion rises upwards through the reactor chamber 6 towards the outlet portion 5. The shell structure 3 further comprise a head room portion 7 having a shelf 7b within the inner space of the shell structure. The shelf 7b is arranged to receive and support a tab portion 20b of at least one electrode plate 20. The head room portion further comprises a ledge 7a formed on the outer surface of the shell structure 3 within a cavity 9. The cavity 9 extends through the shell structure 3 without penetrating its outer surface. That is to say, the cavity is separated from the inner space by the shell structure 3. The ledge 7a is positioned accordingly with the shelf 7b such that when a support element 2a of a support structure is placed under the ledge, a tab portion 20b of an electrode plate placed on the shelf 7b rests above the support element 2a. With such an arrangement, the load of the electrode plate 20 does not strain the shell structure 3, but is carried by the support structure 2. An airflow inlet 7c and an airflow outlet 7d are also provided, preferably on the head room portion 7, for ventilating fumes generated within the electrochemical reactor 1.

Although, in the arrangement of the enclosed drawings, the ledge 7a and the outlet portion 4 extend from the rest of the shell structure 3 laterally in the same direction, the present invention may be implemented alternatively.

Figure 3B:
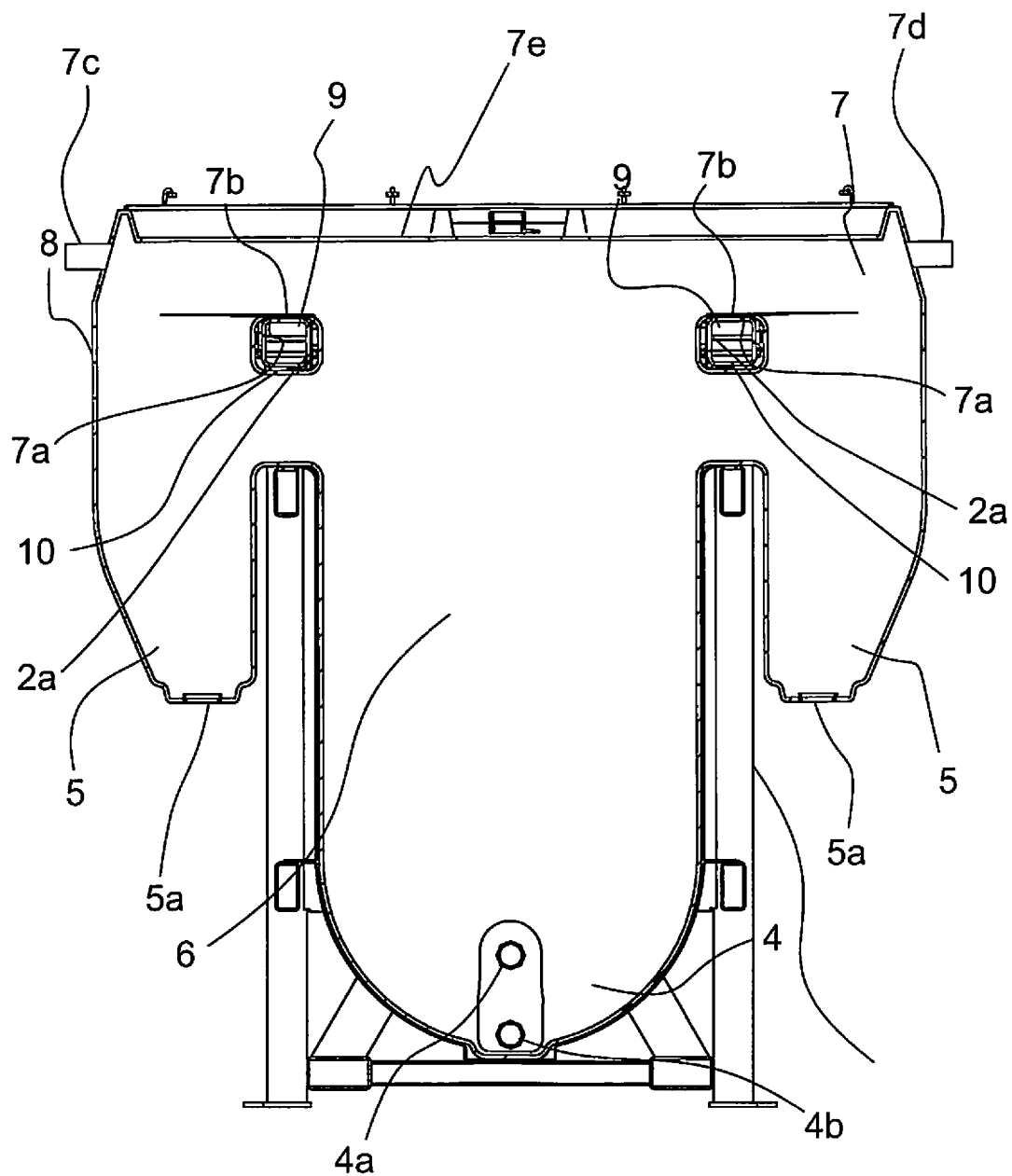
FIG. 3b illustrates a cut view along line A-A of FIG. 1c.

FIG. 3b illustrates a cut view along line A-A of FIG. 1c. The shell structure 3 is supported on the support structure 2 by the support element 2a extending through the cavity 9 carrying the shell structure by the ledge 7a.

Figure 3C:
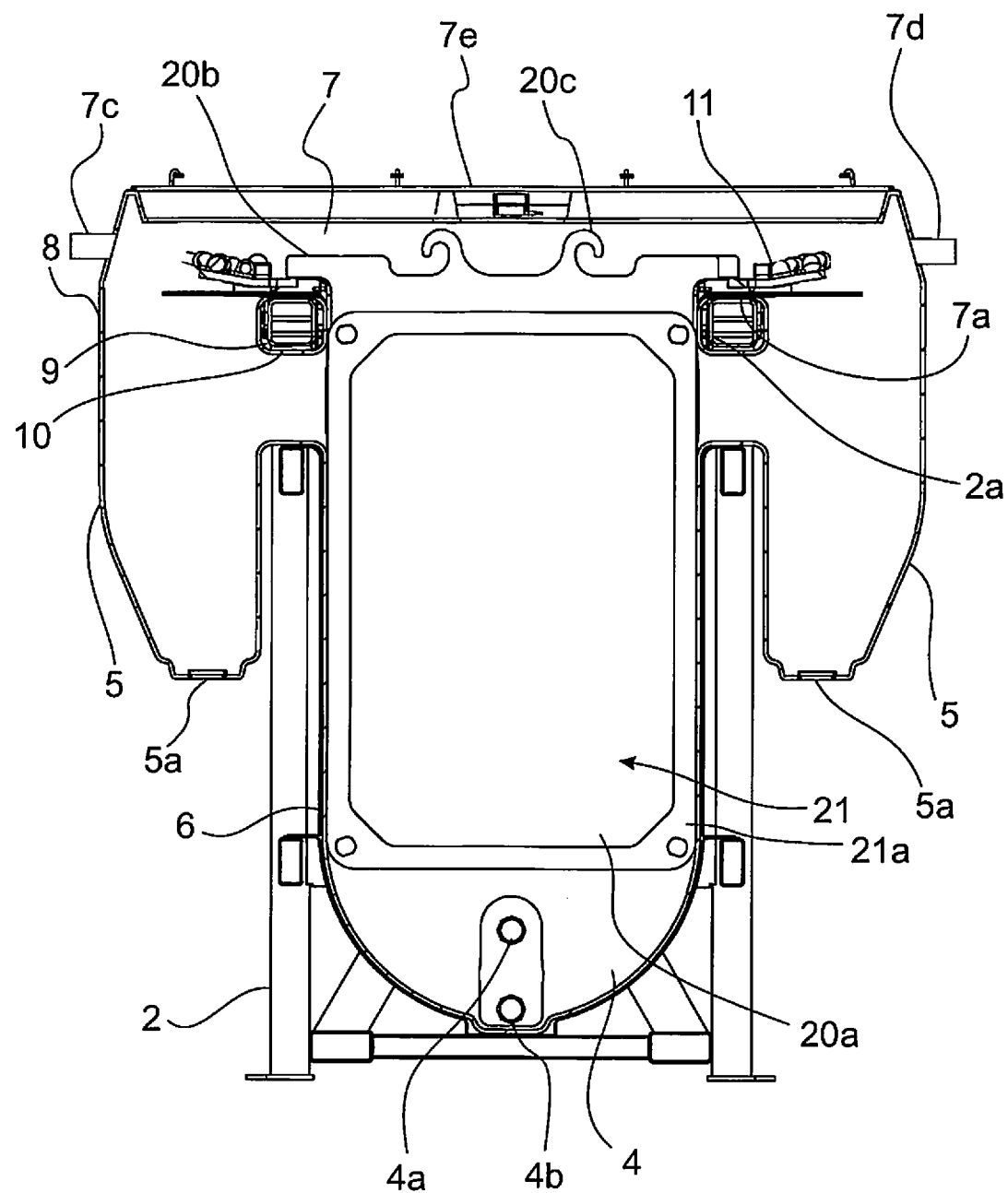
FIG. 3c illustrates the cut view of FIG. 3b further equipped with an electrode module an electrical coupling means.

FIG. 3c. illustrates the cut view of FIG. 3b further equipped with electrode module 21 and electrical coupling means 11. The lug portion 20b of an electrode plate 20 is positioned on the shelf 7b directly above the ledge 7a, and consequently, the support element 2a. Electrical coupling means 11 are provided as a bus bar on the shelf 7b for connecting the electrode plate 20 to a power source.

Figure 4:
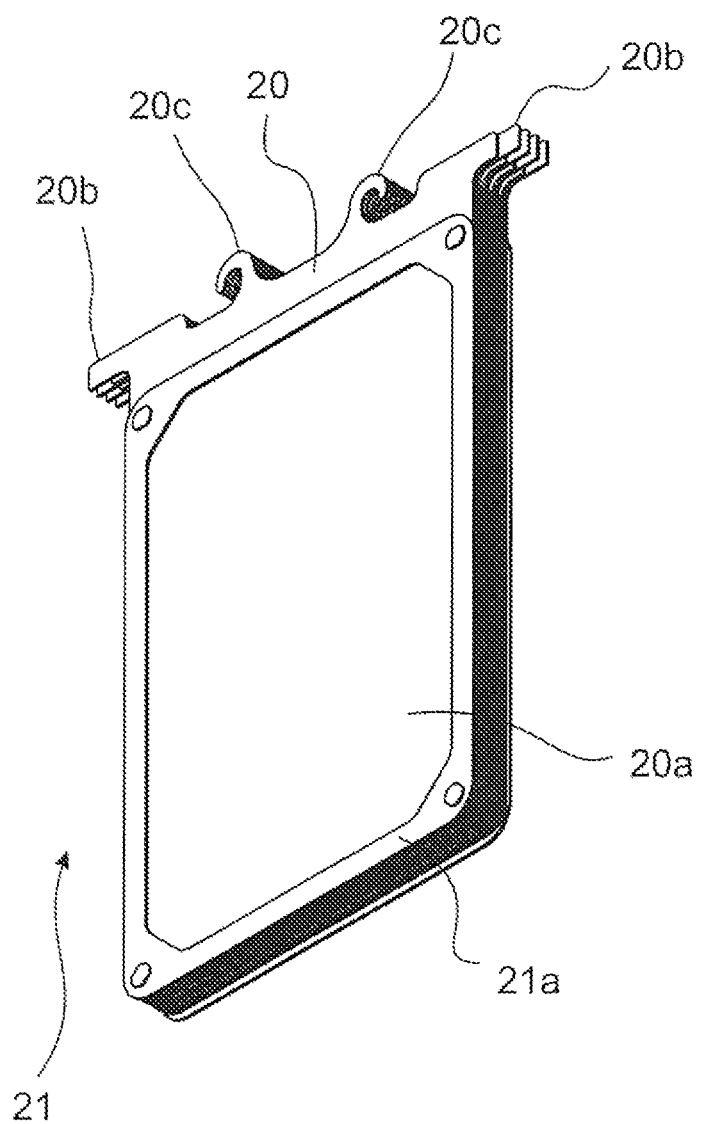
FIG. 4 illustrates a perspective view of an electrode module according to an aspect of the present invention.

FIG. 4 illustrates an electrode module 21 according to an aspect of the present invention. The electrode module 21 comprises multiple electrode plates 20, each having a plate portion 20a and two opposing lug portion 20b. One of the lug portions 20b extends further than the other for facilitating the electrode plates to be alternatingly connected to electrical coupling means 11 by the longer lug portion 20b. The electrode plates 20 are space apart from each other within the electrode module 21, and the module comprises and spacing frame 21a on its each side for spacing adjacent electrode modules 21 form each other. Furthermore, the electrode plates 20 have a lifting portion with hooks 20c for facilitating handling of the electrode plates 20 and the electrode module 21, e.g. with a crane.

According to a first aspect of the present invention, an electrochemical reactor 1 for electrochemically treating water is provided. The electrochemical reactor comprises a shell structure 3 and a support structure 2 for supporting the shell structure 3 on a base. The shell structure 3 defines an inner space, through which a water flow is to be directed.

Further, the shell structure 3 comprises an inlet portion 4 having an inlet 4a for conducting a water flow to the inner space, and an outlet portion 5 having an outlet 5a for conducting the water flow out of the electrochemical reactor 1. The shell structure 3 has a reactor chamber 6 in flow connection between the inlet portion and the outlet portion, such that the water flow will flow through the reactor chamber 6. The reactor chamber 6 is arranged to receive a plate portion 20a of at least one electrode plate 20 such that the water flow will be directed past at least one electrode plate. The shell structure 3 further comprises a head room portion 7 that comprises, on an outside of the shell structure 3, at least one ledge 7a formed by an outer surface of the shell structure 3.

Preferably the ledge 7a and the outlet portion 5 extend laterally from the rest of the shell structure in the same direction. This enables arranging electrode plates 20 so as to be parallel with the direction of the water flow at the point of the flow connection between the reactor chamber 6 and the outlet portion 5.

Further, as the outlet portion 5 extends laterally from the reactor chamber 6, a conduit may be formed between the outlet portion 5 and the reactor chamber 6. This provides for a controlled, less turbulent or even laminar flow in the vicinity of the electrode plates 20 and the outlet portion 5. This, in turn, decreases wearing of the electrode plates 20 Also, the need for separate means for guiding the water flow towards the outlet portion is removed. An additional benefit is that monitoring of the fluid level at the outlet portion 5 is further facilitated because, as discussed above, the flow is controlled and less turbulent. Hence, less foam is formed and the fluid level can be monitored more reliably.

The support structure 2 comprises at least one support element 2a supporting the shell structure 3 from the ledge 7a. Preferably, the support element 2a is a transverse beam extending horizontally from the rest of the support structure.

The head room portion 7 comprises, within the inner space of the shell structure 3, at least one shelf 7b for receiving and supporting at least one lug portion 20b of the at least on electrode plate 20 for suspending the at least one electrode plate 20 within the electrochemical reactor, preferably such that the plate portion 20a is suspended within the reactor chamber 6. Naturally, additional components may be placed between the at least one lug portion 20b of the at least on electrode plate 20 and the shelf 7b. For example, a bus bar for receiving the lug portion 20b and for electrically connecting the electrode plate with a power source, a layer of insulating material, a layer of elastic material such as a rubber mat, or any combination thereof may be placed between the lug portion 20b and the shelf 7b. The purpose of these layers is to provide electrical insulation, heat insulation, or both, and to further to compensate for manufacturing tolerances, thus facilitating fitting of the lug portion 20b or a bus bar on the shelf 7b.

The shelf 7b may be formed by a level portion of the inner surface. Correspondingly, the ledge may be formed by a level portion of the outer surface. Preferably, the shelf 7b is located, when in use, directly above the ledge 7a. Furthermore, the shelf 7b and the ledge 7a may be on opposite sides of the shell structure's 3 shell, the shelf 7b being on the inner surface, and the ledge 7a on the outer surface.

The head room portion 7 may further comprise a removable lid for facilitating the insertion or replacement of electrode plates 20 or electrode modules 21.

Preferably, but not necessarily, the electrochemical reactor 1 is provided with fluid level sensor means for monitoring the fluid level, particularly the level of the water, within the shell structure 3.

According to a second aspect of the present invention, the inlet portion 4 is preferably arranged, when in use, below the reactor chamber 6. Preferably, the head room portion 7 is arranged above the reactor chamber 6, and the fluid communication between the outlet portion 5 and the reactor chamber 6 is arranged in a top part of the reactor chamber 6. This arrangement ensures, that the water flow will not run through the head room portion 7. Several advantages follow. Firstly, the electrode plate 20 can be replaced through the head room portion 7, or a lid on the top thereof, without draining the electrochemical reactor 1. Secondly, the electrical coupling of the electrode plate 20 with a power source may be done at the head room portion 7. Thirdly, ventilation of fumes may be provided via the head room portion 7.

According to a third aspect of the present invention, the at least one ledge 7a may protrude, particularly from a distal end thereof, towards the outlet portion 5. Such a protrusion 8 provides a strut enhancing the mechanical rigidity of the shell structure 3, particularly of the head room portion 7 and the outlet portion 5. Furthermore, a conduit may be provided between the outlet portion 5 and the head room portion 7 within the protrusion 8, thus realizing fluid connection therebetween, and enabling ventilation of fumes also from the outlet portion 5. An additional benefit of providing a conduit in the protrusion 8 between the headroom portion, preferably the at least one ledge 7a, and the outlet portion 5, is that the fluid level within the inner space may be more accurately measured at the outlet portion 5 than from the reactor chamber. There are several reasons for this; firstly, because the electrode plates 20 occupy the reactor chamber 6, space is very limited for measuring fluid level within the reactor chamber 6. Secondly, the water flows at a slower rate and the flow is generally more constant at the outlet portion 5, resulting in less foaming, and further facilitating fluid level measurement at the outlet portion 5. Preferably, but not necessarily, a fluid level sensor is provided at the outlet portion 5 for monitoring the fluid level, particularly the level of the weater, within the shell structure 3. Naturally, the any given type of fluid level sensor may be used for determining the fluid level at the outlet portion 5. Furthermore, the measurement acquired by the fluid level sensor may used for controlling the electrochemical process.

According to a fourth aspect of the present invention, at least one cavity 9 is formed on the outer surface of the shell structure 3. Preferably, the cavity 9 is located, when in use, beneath the at least one ledge 7a. Furthermore, the at least one cavity 9 extends towards, preferably through, the inner space of the shell structure 3, such that the at least one cavity 9 is separated from the inner space by the shell structure 3. In other words, the cavity 9 extends through shell structure 3 without penetrating its outer surface. The at least one support element 2a extends into the at least one cavity 9, preferably through the at least one cavity 9, for supporting the shell structure 3. Suitably, the cavity is delimited by the head room portion 7, particularly the ledge 7a thereof, the outlet portion 5, the protrusion 8 extending between head room portion 7 and the outlet portion 5, and possibly, the rest of the shell structure.

All though this arrangement has been illustrated in the enclosed drawings, alternative arrangements may be provided within the scope of the present invention. Particularly, the ledge 7a does not need to protrude towards the outlet portion 5, effectively making the ledge 7a a part of an open profile form of the support section 7. In other words, a cavity 9 does not need to be not formed.

According to a fifth aspect of the present invention, the head room portion 7 is in fluid connection with the outlet portion 5, preferably via the protrusion 8 extending between the distal end of the at least one ledge 7a and the outlet portion 5. Alternatively, the fluid connection may be provided in any other suitable manner, e.g. a separate duct. The fluid connection between the outlet portion 5 and the head room portion 7 enables fumes to be ventilated from the outlet portion 5, also. Additionally, if the fluid connection is implemented via the protrusion, material savings are achieved and the weight of the shell structure 3 is reduced as the protrusion may be hollow.

According to a sixth aspect of the present invention, the electrochemical reactor 1 is equipped with a weight sensor means 10 for measuring the weight of the at least one electrode plate 20. In the enclosed drawings, the weight sensor means 10 have been illustrated as arranged between the support element 2a and the rest of the support structure 2. However, other arrangements may naturally be used. Preferably, the weight sensor means is arranged in the support structure 2, between the support element 2a and the rest of the support structure 2, between the support element 2a and the shell structure 3, on the at least one shelf 7b, or any combination thereof. For example, any kind of load cell may be used as the weight sensor means. Naturally, any other suitable type of sensor may be used. As the weight of all the other components of the electrochemical reactor 1 is known, the weight of the at least one electrode plate can be derived by comparing the output of the weight sensor means 10 and the weight of the rest of the electrochemical reactor 1. More particularly, the change in the weight of the at least one electrode plate 20 can be derived simply by comparing the output of the weight sensor means 10 at two different time instances. Should there be a noticeable fluid volume fluctuation within the shell structure during operation, the increase or decrease in weight caused by the water volume change can be compensated for by monitoring the fluid level within the shell structure. Particularly, the change in weight caused by the water volume can be rather accurately determined based on the fluid level.

The weight sensor means enables advanced control over the electrochemical process based on the weight, or change in weight, of the at least one electrode plate 20. For example, the life time and replacement cycle of the at least one electrode plate 20 can be more accurately estimated or determined, and the operation of the electrochemical process can be evaluated. Furthermore, measurements obtained by the weight sensor means can be utilized in monitoring and controlling the electrochemical process, thus facilitating automated control and remote monitoring of the process. Details of such application are discussed later on.

According to a seventh aspect of the present invention, the electrochemical reactor is equipped with electrical coupling means 11 for coupling the at least one electrode plate 20 to a power source. The electrical coupling means 11 are suitably arranged within the inner space of the shell structure 3, in the head room portion 7. Advantageously, the electrical coupling means 11 are arranged on the shelf 7b. The electrochemical reactor 1 may naturally be equipped with several electrical coupling means. Particularly should the reactor have more than one shelf 7b, an electrical coupling means 11 may be arranged on each shelf 7b.

Preferably, a bus bar type electrical coupling means 11 are used. This enables the electrical coupling means 11 to engage with the lug portion 20b of the at least one electrode plate 20 simply by inserting the at least one electrode plate 20 into the electrochemical reactor 1. The electrical coupling means 11 may naturally be provided in any other suitable manner. For example, wiring may be directly connected to the electrode plate 20.

Furthermore, the head room portion 7 may comprise an airflow inlet 7c and an airflow outlet 7d for ventilating fumes from within the inner space. In such a case, the electrical coupling means 11 are advantageously arranged between the airflow inlet 7c and the airflow outlet 7d, so that air flowing between the airflow inlet 7c and the airflow outlet 7d provides cooling of the electrical coupling means 11 via convection. The airflow inlet 7c and airflow outlet 7d may alternatively be arranged on, e.g., a lid of the electrochemical reactor 1.

Suitably, the airflow outlet 7d may be connected to an airflow means generating a slight suction that causes an airflow to be sucked into the electrochemical reactor 1 via the airflow inlet 7c, and further, out of the reactor 1 via the outlet 7d. Thus, the fumes generated within the electrochemical reactor are ventilated in a controlled manner along with the airflow.

This is particularly advantageous should the shell structure 3, or any other component of the electrochemical reactor 1, be manufactured from a material having a limited capability to withstand heat. For example, plastics commonly used in rotational molding, a manufacturing method particularly suitable for the shell structure 3, become soft in relatively low temperatures and are thus sensitive to excess heat.

According to an eighth aspect of the present invention, the head room portion 7 comprises, on an outside of the shell structure 3, two ledges 7a formed by an outer surface of the shell structure 3. Furthermore, the head room portion has, within the inner space of the shell structure 3, two shelves 7b for receiving and supporting two lug portions 20b of the at least one electrode plate 20 for suspending the at least one electrode plate 20 within the electrochemical reactor 1. Correspondingly, the support structure 2 comprises two support elements 2a for supporting the shell structure 3 by the two ledges 7a. The shelves 7b are preferably located directly above the ledges 7a, respectively. Preferably the two ledges 7a and two shelves 7b, respectively, are located on opposite sides of the head room portion 7. That is, the head room portion 7 has one ledge 7a and one shelf 7b on each side. This enables a more even load distribution, as the shell structure 3 and the at least one electrode plate 20 are supported at two places.

According to a ninth aspect of the present invention, two cavities 9 are formed on the outer surface of the shell structure 3, preferably, beneath the two ledges 7a, when in use. The two cavities 9 extend towards, preferably through, the inner space of the shell structure 3, such that the two cavities 9 are separated from the inner space by the shell structure 3. In other words, the two cavities 9 extend through the shell structure 3 without penetrating its outer surface. Furthermore, the two support elements 2a extend into the two cavities 9, preferably through the two cavities 9, for supporting the shell structure 3. This enables a more even load distribution together with the increased rigidity of the shell structure 3.

According to a tenth aspect of the present invention, the reactor chamber 6 is arranged to receive plate portions 20a of a plurality of electrode plates 20, preferably plate portions 20a of an electrode module 21 comprising a plurality of electrode plates 20, and more preferably plate portions 20a of a plurality of electrode modules 21, each electrode module 21 comprising a plurality of electrode plates 20.

Correspondingly, the at least one shelf 7b is arranged for receiving and supporting lug portions 20b of the plurality of electrode plates 20, preferably lug portions 20b of the plurality of electrode plates 20 comprised in the electrode module 21, and more preferably lug portions 20b of the plurality of electrode plates 20 comprised in the plurality of electrode modules 21, each electrode module 21 comprising the plurality of electrode plates 20, such that the plurality of electrode plates 20, the electrode module 21, or the plurality of electrode modules 21 may be suspended within the electrochemical reactor. Particularly so that the plate portions 20a are suspended in the reactor chamber 6.

The use of a plurality of electrode plates 20 increases the effective surface area for the electrochemical treatment. Moreover, this enables the use of several different electrode plate materials, targeted for particular electrochemical processes, particular water treatment application, or both. For example, certain electrode plate materials or combinations thereof may be used so as to target different types of impurities, and hence remove them from the water flow. The use of an electrode module 21, in turn, facilitates replacing the electrode plates 20 as they are worn, or customizing the electrochemical reactor 1 for treating a water flow having certain types of impurities. In addition, the use of electrode modules 21 enables the spacing between the electrode plates 20 to be set accurately, which evens the flow profile within the reactor chamber 6 and enhances the electrochemical process. Furthermore, the use of multiple electrode modules 21, each having multiple electrode plates further emphasizes these advantages in addition to enabling the electrode modules 21 to be made smaller, thus facilitating the handling of the electrode modules 21. In addition, this enables combining different electrode modules 21 having different properties or electrode materials.

According to an eleventh aspect of the present invention, the shell structure 3 is made of a plastics material, including, but not limited to polyethylene plastics. Plastics are particularly advantageous, as several electrically non-conductive and chemical resistant plastics are available. Furthermore, this enables complex shapes to be formed easily, for example, by rotational molding. The shell structure may naturally also be manufactured of other suitable materials, such as fiber reinforced plastics.

According to a twelfth aspect of the present invention, a water treatment apparatus for electrochemically treating water is provided. The apparatus comprises an electrochemical reactor 1 as discussed in connection with any of the previous aspects of the present invention. The water treatment apparatus further comprises at least one electrode plate 20 having a plate portion 20a and at least one lug portion 20b. Furthermore, each electrode plate 20 preferably comprises two lug portions 20b opposing from opposite sides of the electrode plate 20. The at least one lug portion 20b is positioned on, and supported by, the at least one shelf 7b, such that the plate portion 20a is suspended within the reactor chamber 6. Preferably, the apparatus comprises a plurality of electrode plates 20 spaced from each other, advantageously in an electrode module 21. More preferably, the apparatus comprises a plurality of electrode modules 21 spaced apart from each other, each having a plurality of electrode plates 20, also space apart from each other.

According to a thirteenth aspect of the present invention, the apparatus further comprises an electrical power source for providing electrical power to the at least one electrode plate 20. The power source is coupled to the at least one electrode plate 20 by electrical coupling means 11, preferably as discussed above. Alternatively, a centralized power source may be used, in which case a single power source may be used for several apparatuses.

According to a fourteenth aspect of the present invention, the apparatus further comprises a control means operationally coupled to the power source for adjusting the electrical power provided to the at least one electrode plate 20, and to the weight sensor means for monitoring the weight of the at least one electrode plate 20. Preferably, the control means are arranged to adjust the electrical power provided to the at least one electrode plate 20 by the power source in response to a measurement obtained from the weight sensor means, preferably a wear degree of at least one electrode plate 20, indicated by the weight of said electrode plate provided by the weight sensor means.

As an electrode plate wears in use, it is important to monitor its condition so that it can be replaced before its properties weaken below a predetermined value. For example, when a plurality of electrode plates 20, spaced from each other, are used, the distance between adjacent electrode plates 20 becomes larger as the electrode plates 20 wear. Consequently, a higher electrical power has to be provided in order to conduct a similar current so as to achieve a desired current density between the adjacent electrode plates 20. As the dimensions and density of the electrode plates are known, the change in weight can be used for determining the change in the distance between adjacent electrode plates 20.

Preferably, the weight sensor means 10 are arranged to separately monitor the weight, particularly the change thereof, of a plurality of electrode modules 21. Correspondingly, the control means may be arranged so as to adjust the electrical power provided to the plurality of electrode modules 21 by the electrical power source in response to the change in weight of at least one of the electrode modules 21. If the separate electrode modules 21 comprise electrode plates 20 of different materials, this may be particularly beneficial, as the water treatment process may be optimized with respect to certain impurities, the treatment of which are related to a certain electrode module 21.

Preferably, the control means are further operationally coupled to the fluid level sensor means for obtaining a measurement indicative of the fluid level, particularly that of the water flow, within the shell structure 3. Should the water level within the shell structure 3 fluctuate noticeably, the accuracy of the measurements regarding the weight of the at least one electrode plate 20, provided by the weight sensor means 10, may decrease. Hence, the control means may be arranged to determine, based on at least one measurement provided by the fluid level sensor means, any measurement provided by the weight sensor means as a normalized measurement. Such normalized measurements will be representative of the weight, or change therein, of at least one electrode plate 20 regardless of the fluid level within the shell structure 3.

According to a fifteenth aspect of the present invention, a water treatment system is provided. The system comprises a water treatment apparatus as discussed in connection with any of the aspects above and is further equipped with a water flow means for directing a water flow to the inlet 4a and for receiving a water flow from the outlet 5a. The water flow means may suitably comprises valve means for controlling the water flow to the inlet 4a, the water flow from the outlet 5a, or both. Additionally, the water flow means may suitably be operationally connected to the control means, thus allowing the water flow to the inlet 4a, the water flow from the outlet 5a, or both, to be controlled by the control means. Preferably the water flow means are provided as a part of a water production, circulation or discharge systems.

Particularly, a water treatment apparatus as discussed in connection with any of the aspects above may be used in a system for treating at least one of inorganic waste water such as mining and metals waste waters, electronics waste waters, chemical waste waters, car industry waste waters, and organic waste water such as food & beverage waste waters, textile and clothing waste waters, pulp and paper waste waters, domestic waste waters and agricultural waste waters.

Particularly, a water treatment apparatus as discussed in connection with any of the aspects above may be used in a system for treating water originating from pulp and paper, chemical industry, electronic and car industry, and textile and clothing industry.

Particularly, a water treatment apparatus as discussed in connection with any of the aspects above may be used in a system for domestic waste water treatment, municipal waste water treatment, and/or municipal drinking water treatment.

According to sixteenth aspect of the present invention, an electrode module 21 for use in an electrochemical reactor 1, as discussed in connection with any of the aspect above, is provided. The electrode module comprises multiple electrode plates 20 spaced apart from each other. Each electrode plate 20 comprises a plate portion 20a and at least one lug portion 20b. The plate portion 20a is arranged to be receivable within the reactor chamber 6. Correspondingly, the at least one lug portion 20b is arranged to be receivable on, and supportable by, the at least one shelf 7b, such that the plate portion is suspendable within the reactor chamber 6.

According to a seventeenth aspect of the present invention, a method for controlling a water treatment apparatus, as discussed in connection with any of the aspects above, is provided. The method comprises the following steps:

a) A water flow is provided to the inlet 4a, and the water flow is received from the outlet 5a.

b) A first electrical power is provided to the at least one electrode plate 20, preferably by the electrical power source via the electrical coupling means 11.

c) A first measurement indicative of a weight of the at least one electrode plate 20 is obtained at a first time instance.

Preferably, the first measurement is obtained from the weight sensor means 10 by the control means.

d) When the first measurement indicative of a weight of the at least one electrode plate 20 corresponds to a pre-determined electrode replacement value, generating, by the control means, a signal indicating that the at least one electrode plate 20 requires replacement.

Preferably, the control means are equipped with, or operationally connected to, a communication means for communicating the signal indicating required replacement. Suitably, the communication means may be, for example, audio communication means, visual communication means, network communication means, or any combination thereof. Suitably the communication means comprise network communication are arranged for communicating with a remote monitoring system.

Naturally, if the weight sensor means do not provide an absolute value of the weight of the at least one electrode plate 20, multiple measurements may be made for determining the weight of the at least one electrode plate. For example, a reference measurement may be made without the at least one electrode plate 20 in place, with at least one newly replaced electrode plate 20 in place, or both. Using reference measurements enables the absolute value of the weight of the at least one electrode plate 20 to be determined even if the weight sensor means do not provide an absolute weight as such.

According to an eighteenth aspect of the present invention, a method for controlling a water treatment apparatus, as discussed in connection with any of the aspects above, is provided. The method comprises the following steps:

a) A water flow is provided to the inlet 4a, and the water flow is received from the outlet 5a.

b) A first electrical power is provided to the at least one electrode plate 20, preferably by the electrical power source via the electrical coupling means 11.

c) A first measurement indicative of a weight of the at least one electrode plate 20 is obtained at a first time instance.

Preferably, the first measurement is obtained from the weight sensor means 10 by the control means.

e) A second measurement indicative of the weight of the at least one electrode plate 20 is obtained at a second time instance, wherein the second time instance occurs after the first time instance.

Preferably, the second measurement is obtained from the weight sensor means 10 by the control means.

f) A weight loss of the at least one electrode plate 20 is determined by the control means based on the first measurement and the second measurement.

Preferably, the weight loss is determined by determining the difference between the first measurement and the second measurement.

g) Based on the determined weight loss, adjusting the first electrical power.

Monitoring the weight, or the change in weight, of the at least one electrode plate 20 thus enables automated process control and remote monitoring, which is particularly advantageous in applications where continuous or manual process monitoring is not available, such as in automated water treatment solutions.

According to a nineteenth aspect of the present invention, the method for controlling a water treatment apparatus, as discussed in connection with the eighteenth aspect, may further comprise the following method step:

h) If the weight loss of the at least one electrode plate 20 exceeds a predetermined weight loss threshold value corresponding to a wear degree of at least one electrode plate resulting in a diminished current density, adjusting the first electrical power by providing a second electrical power.

As the electrode plates 20 wear in use, the distance between adjacent electrode plates increases, resulting in a lower current passing through the electrode plates, and consequently, in a lower current density. As the wear degree of the electrode plates can be determined from their weight, or change in weight, the information provided by the weight sensor means can be used for controlling a power source connected to the electrode place such that increased distance between adjacent electrode plates is compensated for in order to maintain a desired current density.

According to a twentieth aspect of the present invention, the method for controlling a water treatment apparatus, as discussed in connection with the eighteenth aspect, may further comprise the following method steps:

i) based on the time difference between said first time instance, said second time instance and the weight loss of the at least one electrode plate 20, determining a weight loss rate;

j) comparing determined weight loss rate to a predetermined desired weight loss rate corresponding to a desired electrochemical process efficiency, and k) if the weight loss rate deviates from predetermined desired weight loss rate by more than a predetermined weight loss rate threshold value, adjusting the first electrical power by providing a second electrical power, in order to obtain a weight loss rate corresponding said predetermined desired weight loss rate.

The information obtained by the weight sensor means can be used for controlling the electrochemical process in order to obtain a desired weight loss rate of the at least one electrode plate. Particularly, if an amount X of a substance in an electrode plate is required for the removal of an amount Y of impurities in the water flow, and the water flow rate is known, a desired weight loss rate can be calculated. Consequently, using the information obtained from the weight sensor means, the electrochemical process can be controlled in order to obtain such a desired weight loss rate.

Preferably, the first electrical power is adjusted by providing a second electrical power to the at least electrode one plate 20 by the electrical power source via the electrical coupling means 11, wherein the second electrical power differs from the first electrical power.

Naturally, should multiple electrode plate be used, the first electrical power may be provided as a first differential voltage between adjacent electrode plates 20, and correspondingly, the electrical power may be a second differential voltage between adjacent electrode plates 20. Naturally, the first and/or second electrical powers may be provided as a substantially constant voltage, for producing a direct current, and respectively, an alternating voltage may be provided for producing an alternating current. Furthermore, both a constant voltage and an alternating voltage may be provided as differential voltages between adjacent electrode plates 20. Additionally, the polarities of adjacent electrode plates may be reversed between any given intervals for removing oxidation form the surfaces thereof.

According to a twenty-first aspect of the present invention, a method for controlling a water treatment system, as discussed above in connection with the fifteenth aspect, is provided. The method comprises the steps of:
- a) A water flow is provided to the inlet 4a), and the water flow is received from the outlet (5a) by the water flow means.
- b) A first electrical power is provided to the at least one electrode plate 20, preferably by the electrical power source via the electrical coupling means 11.
- l) A first measurement indicative of a water volume at a first time instance is obtained with the weight sensor means 10.

Preferably, the first measurement is obtained from the weight sensor means 10 by the control means.
- m) A second measurement indicative of a water volume at a second time instance is obtained with the weight sensor means 10, wherein the second time instance occurs after the first time instance.

Preferably, the first measurement is obtained from the weight sensor means 10 by the control means.
- n) A change in water volume is determined based on the first measurement and the second measurement, preferably by the control means.
- o) The water flow means is adjusted based on the change in water volume, preferably by the control means.

In addition, or alternatively, to controlling the electrochemical process based on the information related to the weight of the at least one electrode plate 20, the weight sensor means 10 can be used for obtaining information related to the water volume within the shell structure 3. Furthermore, as the shell structure 3 has a constant shape, the water level within the shell structure can be determined by the water volume.

Particularly, a weight change due to the wear of the at least one electrode plate can be distinguished from a weight change due to a change in water volume because of their different magnitudes over a given time period. That is, the weight change caused by the wearing of an electrode plate 20 is much slower than the weight change due to variation of the water volume within the shell structure. Moreover, wear of the at least one electrode plate 20 will result in a slow paced decrease in weight, whereas the variation in the water volume may cause the weight to increase.

Suitably, if an increase in weight exceeding a predetermined water volume threshold value is determined by the control means, based on values obtained from the weight sensor means 10, the control means are arranged to control the water flow means to decrease the rate of the water flow provided to the inlet 4a, or alternatively even suspend the water flow provided to the inlet. Particularly, an exceptionally rapid increase in weight might be an indication in malfunction related to the outlet portion 5 or the water flow means on the outlet side. Correspondingly, if such a situation is determined by the control means, based on values obtained from the weight sensor means 10, the control means may be arranged to control the water flow means to stop the water flow provided to the inlet 4a, disconnect the electrical power source from the electrical coupling means 11, or both.

Furthermore, all of the aspects, or any combination thereof, relating to controlling an electrochemical apparatus, system, or both, discussed above may be used simultaneously or alternately for achieving a desired operational mode at any given time. The aspects relating to controlling an electrochemical apparatus may be complemented by any other control modes, for example, controlling the process based on measurements from analyzers detecting impurities, conductivity, change of redox potential, COD, etc.

According to a twenty-second aspect of the present invention, a computer program product for controlling a water treatment apparatus is provided The computer program product comprises instructions that, when executed on a control means of an water treatment apparatus as discussed in connection with any of the apparatus aspects discussed above, causes said water treatment apparatus to perform method steps as discussed in connection with one or more of the aspects relating to a method for controlling a water treatment apparatus.

According to a twenty-third aspect of the present invention, a computer program product for controlling a water treatment system is provided The computer program product comprises instructions that, when executed on a control means of an water treatment system as discussed in connection with any of the system aspects discussed above, causes said water treatment system to perform method steps as discussed in connection with one or more of the aspects relating to a method for controlling a water treatment system.

Naturally, according to the present invention, an electrochemical reactor, an apparatus and a system for electrochemically treating water, a method for controlling a water treatment apparatus, and a computer program product related thereto may be implemented by combining two or more aspects as discussed above without departing from the inventive concept.

The invention claimed is:

1. A water treatment apparatus for electrochemically treating water having an electrochemical reactor for electrochemically treating water, comprising a shell structure and a support structure for supporting the shell structure on a base,
   wherein the shell structure defines an inner space, said shell structure further comprising:
       an inlet portion comprising an inlet for conducting a water flow to the inner space;
       an outlet portion comprising an outlet for conducting the water flow out of the electrochemical reactor;
       a reactor chamber in flow connection between the inlet portion and the outlet portion, the reactor chamber being arranged for receiving a plate portion of at least one electrode plate so as to direct the water flow past the at least one electrode plate, and
       a head room portion comprising,
           on an outside of the shell structure, at least one ledge formed by an outer surface of the shell structure,
   wherein the support structure comprises at least one support element supporting the shell structure from the ledge,
   the head room portion comprises, within the inner space of the shell structure, at least one shelf for receiving and supporting at least one lug portion of the at least one electrode plate for suspending the at least one electrode plate within the electrochemical reactor, the shelf being located directly above the ledge, and
   the apparatus further comprises at least one electrode plate having a plate portion and at least one lug portion, wherein the at least one lug portion is positioned on, and supported by, the at least one shelf, such that the plate portion is suspended within the reactor chamber.

2. The water treatment apparatus according to claim 1, wherein the inlet portion is arranged below the reactor chamber, the head room portion is arranged above the reactor chamber, and the fluid communication between the outlet portion and the reactor chamber is arranged in a top part of the reactor chamber.

3. The water treatment apparatus according to claim 1, further comprising a protrusion extending between a distal end of the at least one ledge and the outlet portion.

4. The water treatment apparatus according to claim 1, further comprising at least one cavity formed on the outer surface of the shell structure, when in use, beneath the at least one ledge,
  wherein the at least one cavity extends towards and through, the inner space of the shell structure, the at least one cavity being separated from the inner space by the shell structure, and
  wherein the at least one support element extends into the at least one cavity for supporting the shell structure.

5. The water treatment apparatus according to claim 1, wherein the head room portion is in fluid connection with the outlet portion via the protrusion extending between the distal end of the at least one ledge and the outlet portion.

6. The water treatment apparatus according to claim 1, wherein the reactor is equipped with a weight sensor means for measuring the weight of the at least one electrode plate.

7. The water treatment apparatus according to claim 1, further comprising electrical coupling means for coupling the at least one electrode plate to a power source,
  wherein the electrical coupling means is arranged within the inner space of the shell structure, in the head room portion on the at least one shelf,
  wherein the head room portion comprises an airflow inlet and an airflow outlet for ventilating fumes from within the inner space, and
  wherein the coupling means are arranged between the airflow inlet and the airflow outlet, such that air flowing between the airflow inlet and the airflow outlet provides cooling of the electrical coupling means.

8. The water treatment apparatus according to claim 1, wherein the head room portion comprises:
  on an outside of the shell structure, two ledges formed by an outer surface of the shell structure,
  within the inner space of the shell structure, two shelves for receiving and supporting two lug portions of the at least on electrode plate for suspending the at least one electrode plate within the electrochemical reactor, and
  wherein the ledges and shelves, respectively, are located on opposite sides of the head room portion, and, when in use, the shelves are located directly above the ledges, respectively, and
  wherein the support structure comprises two support elements for supporting the shell structure by the two ledges, respectively.

9. The water treatment apparatus according to claim 8, wherein two cavities are formed on the outer surface of the shell structure beneath the two ledges, wherein the two cavities extend towards and through, the inner space of the shell structure, the two cavities being separated from the inner space by the shell structure, and wherein the two support elements extend into the two cavities and through the two cavities, for supporting the shell structure.

10. The water treatment apparatus according to claim 1, wherein the reactor chamber being arranged to receive plate portions of a plurality of electrode plates, and respectively, the at least one shelf being arranged for receiving and supporting lug portions of the plurality of electrode plates.

11. The water treatment apparatus according to claim 1, wherein the shell structure is made of a plastics material, by rotational molding.

12. The water treatment apparatus according to claim 1, wherein the apparatus further comprises a power source, wherein the power source is coupled to the at least one electrode plate by electrical coupling means.

13. The water treatment apparatus according to claim 12, wherein the apparatus further comprises a control means operationally coupled to the power source and to a weight sensor means for monitoring the weight of the at least one electrode plate, wherein said control means are arranged to control the output voltage of the power source in response to a change in weight of the at least one electrode plate indicated by the weight sensor means.

14. A method for controlling a water treatment apparatus according to claim 12, comprising the steps of:
  a) providing a water flow to the inlet, and receiving the water flow from the outlet;
  b) providing a first electrical power to the at least one electrode plate;
  c) obtaining a first measurement indicative of a weight of the at least one electrode plate at a first time instance with a weight sensor means, and
  d) when the first measurement indicative of a weight of the at least one electrode plate corresponds to a predetermined electrode replacement value, generating, by the control means, a signal indicating that the at least one electrode plate requires replacement.

15. A method for controlling a water treatment system according to claim 14 having a water treatment apparatus further comprising the steps of:
  l) obtaining a first measurement indicative of a water volume at a first time instance with the weight sensor means;
  m) obtaining a second measurement indicative of a water volume at a second time instance, wherein the second time instance occurs after the first time instance;
  n) determining a change in water volume based on the first measurement and the second measurement, and
  o) based on the change in water volume, adjusting the water flow means.

16. A computer program product for controlling a water treatment system, the computer program product comprising instructions that, when executed on a control means of the water treatment system causes said water treatment system to perform the method of claim 15.

17. A computer program product for controlling a water treatment apparatus, the computer program product comprising instructions that, when executed on a control means of the water treatment apparatus causes said water treatment apparatus to perform the method of claim 14.

18. A method for controlling a water treatment apparatus according to claim 12, comprising the steps of:
  a) providing a water flow to the inlet, and receiving the water flow from the outlet;
  b) providing a first electrical power to the at least one electrode plate;
  c) obtaining a first measurement indicative of a weight of the at least one electrode plate at a first time instance with a weight sensor means;
  e) obtaining a second measurement indicative of the weight of the at least one electrode plate at a second time instance, wherein the second time instance occurs after the first time instance;
  f) determining a weight loss of the at least one electrode plate by the control means based on the first measurement and the second measurement, and
  g) based on the determined weight loss, adjusting the first electrical power.

19. The method according to claim 18, further comprising the steps of:
   h) if the weight loss of the at least one electrode plate exceeds a predetermined weight loss threshold value corresponding to a wear degree of at least one electrode plate resulting in a diminished current density, adjusting the first electrical power by providing a second electrical power.

20. The method according to claim 18, further comprising the steps of:
   i) based on the time difference between said first time instance and said second time instance, and the weight loss of the at least one electrode plate, determining a weight loss rate;
   j) comparing determined weight loss rate to a predetermined desired weight loss rate corresponding to a desired electrochemical process efficiency, and
   k) if the weight loss rate deviates from predetermined desired weight loss rate by more than a predetermined weight loss rate threshold value, adjusting the first electrical power by providing a second electrical power, in order to obtain a weight loss rate corresponding said predetermined desired weight loss rate.

21. A water treatment system for electrochemically treating water, comprising the apparatus according to claim 1, wherein the system further comprises a water flow means for directing a water flow to the inlet and for receiving a water flow from the outlet.

\* \* \* \* \*